(12) United States Patent
Waka

(10) Patent No.: US 11,294,216 B2
(45) Date of Patent: Apr. 5, 2022

(54) DISPLAY SUBSTRATE AND DISPLAY DEVICE

(71) Applicant: SHARP KABUSHIKI KAISHA, Sakai (JP)

(72) Inventor: Nobuhiro Waka, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 69 days.

(21) Appl. No.: 16/622,184

(22) PCT Filed: Jun. 7, 2018

(86) PCT No.: PCT/JP2018/021893
§ 371 (c)(1),
(2) Date: Dec. 12, 2019

(87) PCT Pub. No.: WO2018/230440
PCT Pub. Date: Dec. 20, 2018

(65) Prior Publication Data
US 2020/0124906 A1    Apr. 23, 2020

(30) Foreign Application Priority Data

Jun. 14, 2017 (JP) .............................. JP2017-116631

(51) Int. Cl.
| | | |
|---|---|---|
| *G02F 1/1333* | (2006.01) | |
| *G02F 1/1337* | (2006.01) | |
| *G02F 1/1339* | (2006.01) | |
| *G02F 1/1362* | (2006.01) | |

(52) U.S. Cl.
CPC ...... *G02F 1/133345* (2013.01); *G02F 1/1337* (2013.01); *G02F 1/13394* (2013.01); *G02F 1/136227* (2013.01); *G02F 1/13338* (2013.01)

(58) Field of Classification Search
None
See application file for complete search history.

(56) References Cited

U.S. PATENT DOCUMENTS

| | | | |
|---|---|---|---|
| 2014/0063431 A1* | 3/2014 | Shih | G02F 1/1337 349/153 |
| 2015/0301370 A1* | 10/2015 | Moriwaki | G02F 1/1345 349/42 |
| 2019/0219860 A1* | 7/2019 | Yin | G02F 1/13394 |

FOREIGN PATENT DOCUMENTS

JP    2004-184495 A    7/2004

* cited by examiner

*Primary Examiner* — Richard H Kim
(74) *Attorney, Agent, or Firm* — ScienBiziP, P.C.

(57) ABSTRACT

A display substrate includes a substrate, a first conductive member, a second conductive member, an alignment film, an insulator, and a contact hole filler. The substrate includes a display area and a non-display area surrounding the display area. The first conductive member is disposed in the non-display area. The second conductive member is disposed in upper than the first conductive member to partially overlap the second conductive member in the non-display area. The alignment film is disposed upper than the second conductive member to straddle the display area and the non-display area. The insulator is disposed between the first conductive member and the second conductive member in the non-display area. The insulator includes a contact hole in a section overlapping the first conductive member and the second conductive member. The contact hole filler is disposed upper than the second conductive member to fill the contact hole.

13 Claims, 9 Drawing Sheets

FIG.1
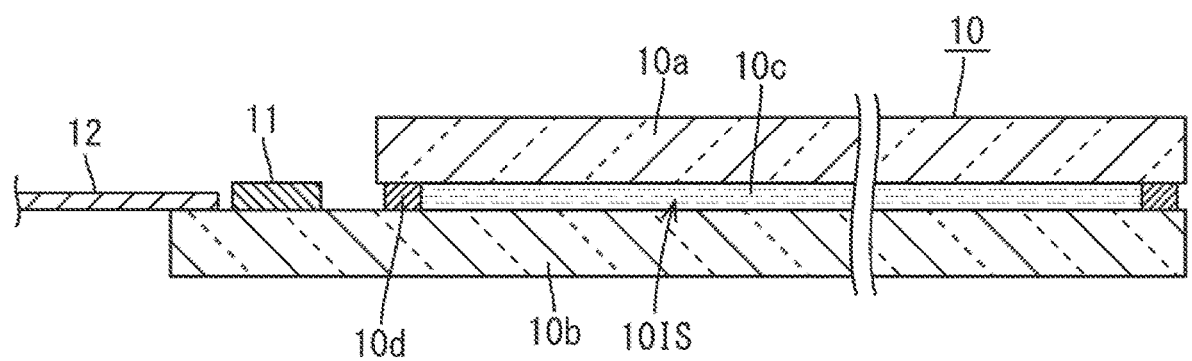
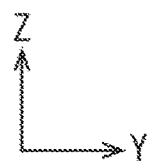

DISPLAY SUBSTRATE AND DISPLAY DEVICE

TECHNICAL FIELD

The present invention relates to a display substrate and a display device.

BACKGROUND ART

An example of a display device described in Patent Document 1 has been known. The display device described in Patent Document 1 includes scanning lines, data lines, TFTs, and pixel electrodes. The TFTs are disposed to correspond to intersections between the scanning lines and the data lines. The display device further includes an interlayer insulator, contact holes, an adhesive layer, and a conductive layer. The interlayer insulator is formed between the TFTs and the pixel electrodes. The contact holes are drilled through the interlayer insulator for electrical connection between the TFTs and the pixel electrodes. The adhesive layer having conductivity is formed on an inner surface of the interlayer insulator. The conductive layer is formed on the adhesive layer to fill the contact holes. The surface of the interlayer insulator including the contact holes and forming areas of the adhesive layer and the conductive layer is planarized.

RELATED ART DOCUMENT

Patent Document

Patent Document 1: Japanese Unexamined Patent Application Publication No. 2004-184495

Problem to be Solved by the Invention

In the display device described in Patent Document 1, the conductive layer is formed to fill the contact holes that are provided for electrical connection between the TFTs and the pixel electrodes in the display area in which the images are displayed. In recent years, many circuit components and lines are disposed in the non-display area that surrounds the display area and thus contact holes are formed in the non-display area to establish connection. During formation of the alignment film, a thickness of the alignment film around hole edges of the contact holes in the non-display area may become larger. Due to the variation in thickness of the alignment film, display quality in outer edge sections of the display area may be reduced.

Disclosure of the Present Invention

The present invention was made in view of the above circumstances. An object is to reduce variations in thickness of an alignment film.

Means for Solving the Problem

A display substrate according to the present invention includes a substrate, a first conductive member, a second conductive member, an alignment film, an insulator, and a contact hole filler. The substrate includes a display area in which an image is displayed and a non-display area that surrounds the display area. The first conductive member is disposed at least in the non-display area of the substrate. The second conductive member is disposed in a layer that is upper than the first conductive member to at least partially overlap the second conductive member at least in the non-display area of the substrate. The alignment film is disposed in a layer that is upper than the second conductive member to straddle the display area and the non-display area of the substrate. The insulator is disposed between the first conductive member and the second conductive member at least in the non-display area of the substrate. The insulator includes a contact hole in a section that overlaps the first conductive member and the second conductive member. The contact hole filler is disposed in a layer that is upper than the second conductive member in the non-display area of the substrate to fill the contact hole.

In this configuration, the first conductive member and the second conductive member are disposed to overlap each other at least in the non-display area of the substrate. A section of the first conductive member and a section of the second conductive member are connected to each other via the contact hole drilled through the insulator disposed between the first conductive member and the second conductive member. During formation of the alignment film, a material of the alignment film having flowability is supplied to the display area of the substrate. The material flows to spread the display area and the alignment film is formed in the display area. The material may flow from the display area to the non-display area. The material of the alignment film, which has reached the non-display area, remains at a hole edge of the contact hole in the insulator without flowing into the contact hole due to a surface tension. Therefore, a local increase in thickness of the alignment film may occur. Because the contact hole is filled with the contact hole filler disposed in the layer upper than the second conductive member, the material of the alignment film, which has reached the non-display area, is less likely to remain at the hole edge of the contact hole. According to the configuration, the local increase in thickness of the alignment film at the hole edge of the contact hole is less likely to occur and thus a variation in thickness of the alignment film is less likely to occur.

Advantageous Effect of the Invention

According to the present invention, variations in thickness of an alignment film are less likely to occur.

BRIEF DESCRIPTION OF THE DRAWINGS

FIG. 1 is a cross-sectional view schematically illustrating a liquid crystal panel according to a first embodiment of the present invention.

MODES FOR CARRYING OUT THE INVENTION

First Embodiment

Figure 2:
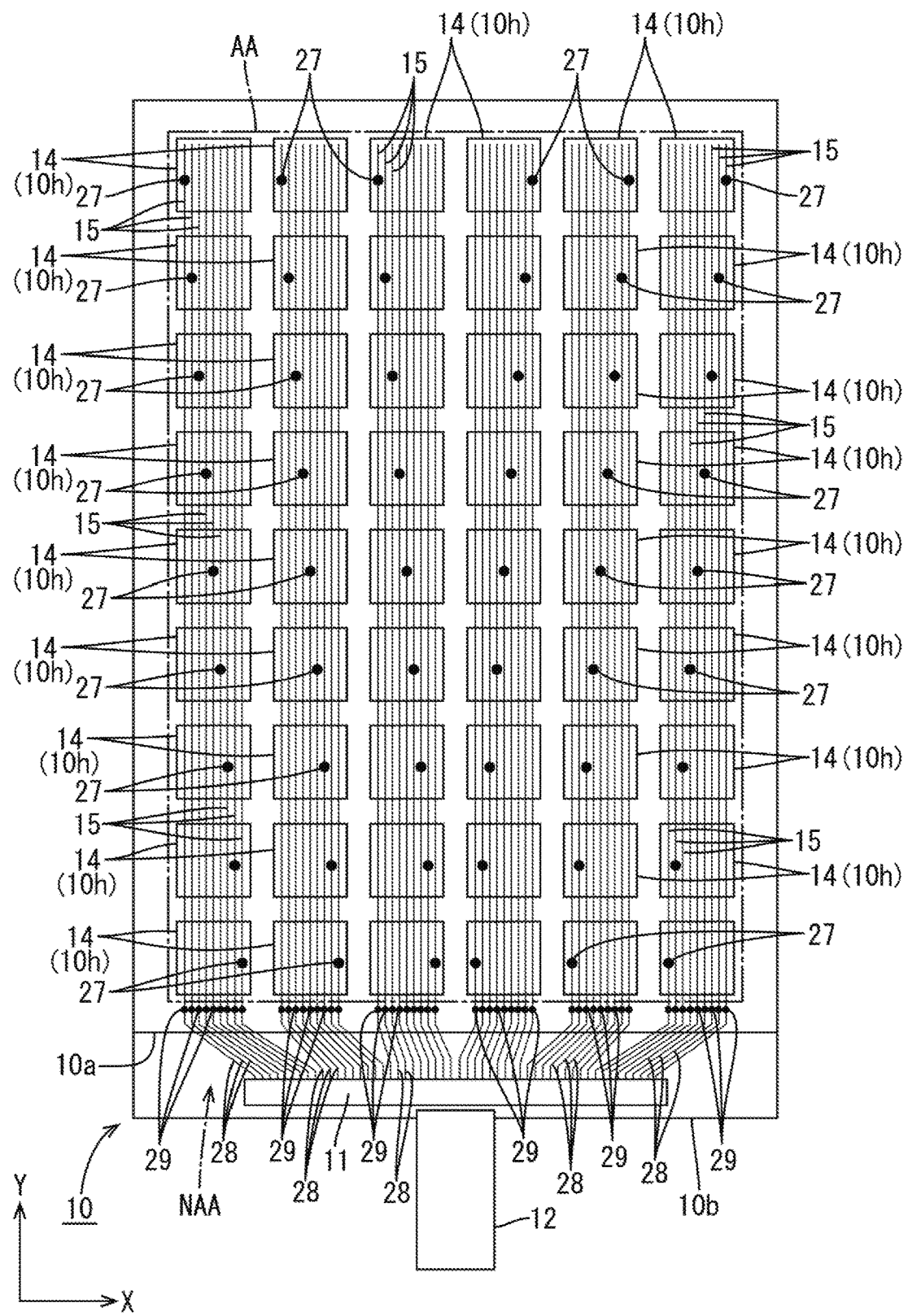
FIG. 2 is a plan view illustrating two-dimensional arrangement of touch electrodes and touch lines in the liquid crystal panel included in a liquid crystal display device.

A first embodiment of the present invention will be described with reference to FIGS. 1 to 7. In this section, a liquid crystal panel 10 (a display device, a display device with a position input function) with a display function and a touch panel function (a position input function) will be described. X-axes, Y-axes, and Z-axes may be present in the drawings. The axes in each drawing correspond to the respective axes in other drawings. An upper side and a lower side in FIGS. 1, 4, 6 and 7 correspond to a front side and a back side of the liquid crystal panel 10, respectively.

The liquid crystal panel 10 is configured to display images using illumination light supplied by a backlight unit (a lighting unit), which is not illustrated. As illustrated in FIG. 1, the liquid crystal panel 10 includes at least a pair of glass substrates 10a and 10b, a liquid crystal layer 10c, and a sealant 10d. The substrates 10a and 10b are substantially transparent and have high light transmissivity. The liquid crystal layer 10c is in an internal space 101S between plate surfaces of the substrates 10a and 10b that are opposed to each other. The liquid crystal layer 10c includes liquid crystal molecules that are substances having optical characteristics that vary according to application of electric fields. The sealant 10d is disposed between the substrates 10a and 10b to surround the internal space 101S (the liquid crystal layer 10c) and seal the internal space 101S and the liquid crystal layer 10c. One of the substrates 10a and 10b included in the liquid crystal panel 10 on the front side is a CF substrate 10a (an opposed substrate). The other one on the rear side (on the back side) is an array substrate 10b (a display substrate, an active matrix substrate, a TFT substrate). The CF substrate 10a and the array substrate 10b are prepared by forming various films on top of one another on inner surfaces of glass substrates 10GS (substrates). The sealant 10d is made of a light curing resin material such as an ultraviolet curing resin material. The sealant 10d has a frame shape to extend along outer edges of the CF substrate 10a (see FIG. 2). Polarizing plates are affixed to outer surfaces of the substrates 10a and 10b, respectively. In FIG. 2, a forming area of the sealant 10d is indicated by a long dashed double-dotted line.

As illustrated in FIG. 2, an inner area of the liquid crystal panel 10 surrounded by the sealant 10d is configured as a display area AA in which images are displayed (an area defined by a chain line in FIG. 2). An outer area in a frame shape surrounding the display area AA is configured as a non-display area NAA in which the images are not displayed. The array substrate 10b included in the liquid crystal panel 10 is larger than the CF substrate 10a. A portion of the array substrate 10b projects from a side of the CF substrate 10a. In the projecting portion of the array substrate 10b (the non-display area NAA), a driver 11 (a driver circuit) and a flexible circuit board 12 (a signal transmitting portion) which are components for supplying various signals related to the display function and the touch panel function are mounted. The driver 11 is an LSI chip including a driver circuit therein and mounted in the projecting portion, which is the non-display area NAA of the liquid crystal panel 10. The driver 11 processes the various signals transmitted via the flexible circuit board 12. The flexible circuit board 12 includes a substrate having insulating property and flexibility and multiple lines formed on the substrate. The flexible circuit board 12 is connected to the projecting portion of the liquid crystal panel 10 and a control circuit board (a signal source), which is not illustrated. According to the configuration, the signals from the control circuit board are transmitted to the liquid crystal panel 10.

Figure 3:
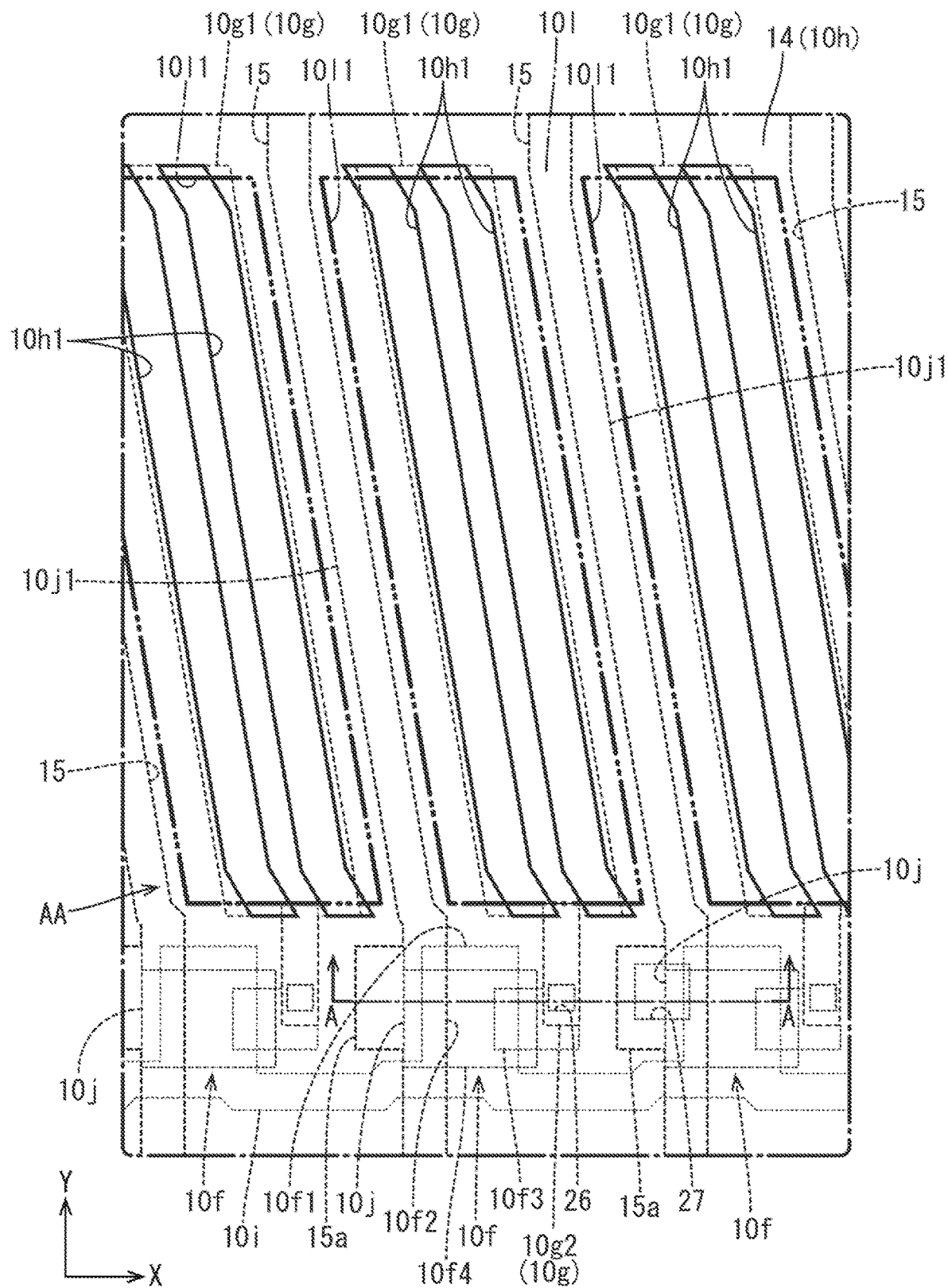
FIG. 3 is a plan view illustrating arrangement of pixels on an array substrate included in the liquid crystal panel.

As illustrated in FIG. 3, thin film transistors 10f (TFTs, switching components) and pixel electrodes 10g are arranged in a matrix along the X-axis direction and the Y-axis direction on an inner surface of the array substrate 10b (on a liquid crystal layer 10c side, on an opposed surface side opposed to the CF substrate 10a) in the display area AA. Gate lines 10i (scanning lines) and source lines 10j (signal lines, data lines) are routed in a grid to surround the TFTs 10f and the pixel electrodes 10g. The gate lines 10i extend in a direction substantially along the X-axis direction. The source lines 10j extend in a direction substantially along the Y-axis direction. The source lines 10j include diagonally extending sections 10j1 that extend in a diagonal direction relative to the X-axis direction and the Y-axis direction. The gate lines 10i are connected to gate electrodes 10f1 of the TFTs 10f. The source lines 10j are connected to source electrodes 10f2 of the TFTs 10f. The pixel electrodes 10g are connected to drain electrodes 10f3 of the TFTs 10f. The TFTs 10f are driven based on various signals supplied to the gate lines 10i and the source lines 10j. Through the driving of the TFTs 10f, application of voltages to the pixel electrodes 10g is controlled. Each of the pixel electrodes 10g has a vertically-long parallelogram shape in a plan view. The source lines 10j are disposed between the pixel electrodes 10g that are adjacent to each other in a short-side direction of the pixel electrodes 10g (the X-axis direction). The gate lines 10i are disposed between the pixel electrodes 10g that are adjacent to each other in a long-side direction of the pixel electrodes 10g (the Y-axis direction). The long sides of the pixel electrodes 10g are parallel to the diagonally extending sections 10j1 of the source lines 10j.

Figure 4:
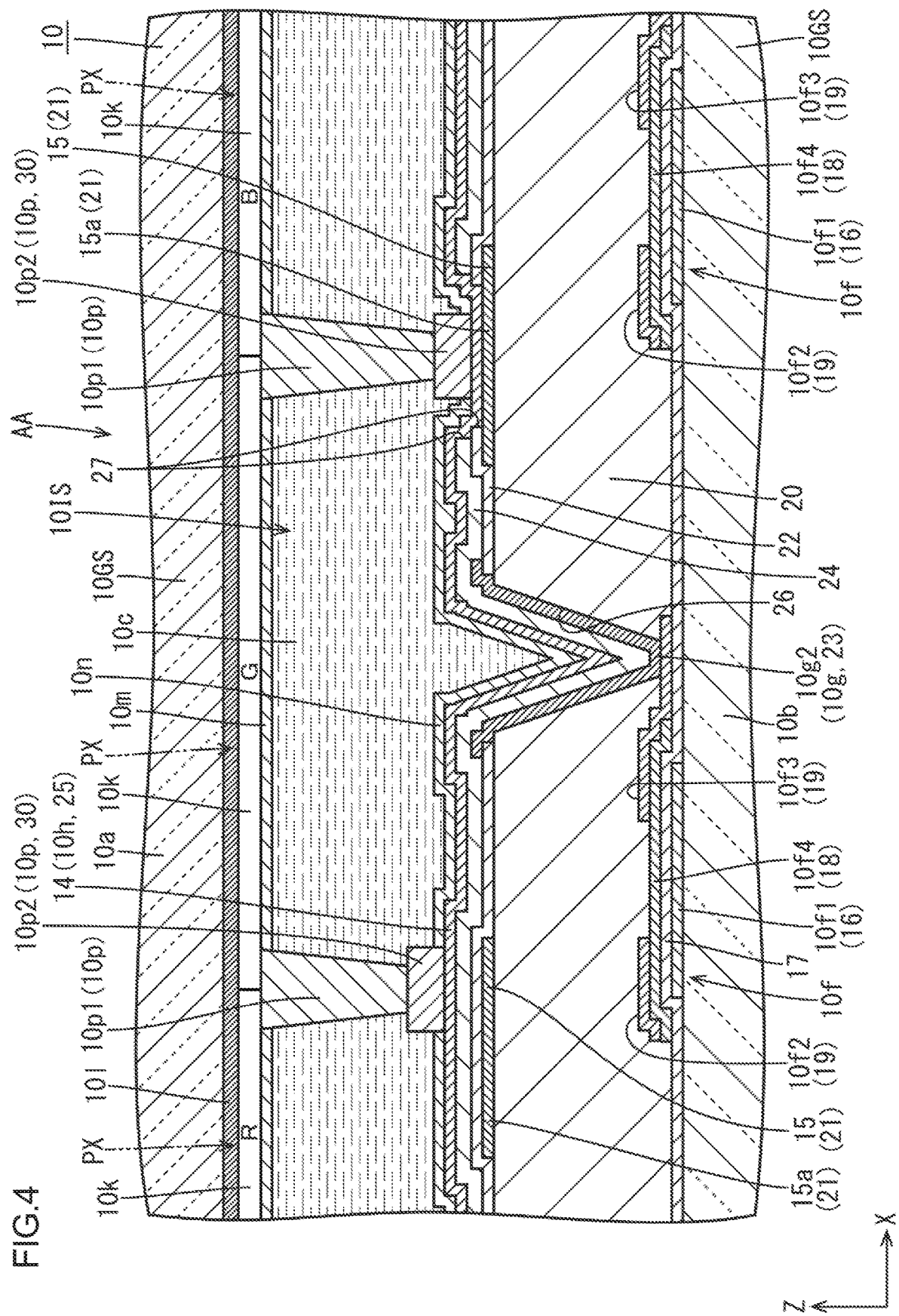
FIG. 4 is a cross-sectional view along line A-A in FIG. 3.

As illustrated in FIGS. 3 and 4, a common electrode 10h is disposed to overlap all pixel electrodes 10g on an upper layer side relative to the pixel electrodes 10g (closer to the liquid crystal layer 10c) in the display area AA on the inner surface of the array substrate 10b. The common electrode 10h spreads over substantially an entire area of the display area AA to apply a reference voltage that is normally about constant. The common electrode 10h includes pixel overlapping openings 10h1 (pixel overlapping slits, alignment control slits) formed in areas overlapping the corresponding pixel electrodes 10g. The pixel overlapping openings 10h1 extend along the diagonally extending sections 10j1. When potential differences are created between the pixel electrodes 10g and the common electrode 10h that overlap each other as the pixel electrodes 10g are charged, fringe electric fields (oblique electric fields) are generated between opening edges of the pixel overlapping openings 10h1 and the pixel electrodes 10g. The fringe electric fields include components parallel to the plate surface of the array substrate 10b and components normal to the plate surface of the array substrate 10b. With the fringe electric fields, orientations of the liquid crystal molecules included in the liquid crystal layer 10c can be controlled. Namely, the liquid crystal panel 10 according to this embodiment operates in fringe field switching (FFS) mode.

As illustrated in FIG. 4, color filters 10k that exhibit three different colors of red (R), green (G), and blue (B) are disposed on the inner surface side of the CF substrate 10a in the display area AA. The color filters 10k that exhibit different colors are repeatedly arranged along the gate lines 10*i* (in the X-axis direction). The color filters 10*k* extend along the source lines 10*j* (substantially the Y-axis direction). Namely, the color filters 10*k* are arranged in a stripe as a whole. The color filters 10*k* are arranged to overlap the pixel electrodes 10*g* on the array substrate 10*b* in a plan view. The color filters 10*k* that are adjacent to each other in the X-axis direction and exhibit different colors are arranged such that boundaries therebetween (color boundaries) overlap the source lines 10*j* and a light blocking portion 10*l*. In the liquid crystal panel 10, the R, the G, and the B color filters 10*k* that are arranged along the X-axis direction and three pixel electrodes 10*g* opposed to the respective color filters 10*k* compose three colors of pixels PX. In the liquid crystal panel 10, the R, the G, and the B pixels PX that are adjacent to one another in the X-axis direction form a display pixel configured to perform color display in predefined tones. An interval of the pixels PX in the X-axis direction is several tens of μm.

As illustrated in FIGS. 3 and 4, the light blocking portion 10*l* (an inter-pixel light blocking portion, a black matrix) configured to block light is disposed on the inner surface side of the CF substrate 10*a* in the display area AA. The light blocking portion 10*l* is formed in a grid pattern in a plan view to separate the adjacent pixels PX (the pixel electrodes 10*g*). The light blocking portion 10*l* includes pixel openings 10*l*1 at positions overlapping large areas of the pixel electrodes 10*g* on the array substrate 10*b* side in a plan view. Light passes through the pixel openings 10/1. The pixel openings 10/1 are arranged in a matrix along the X-axis direction and the Y-axis direction within the plate surface of the CF substrate 10*a* similar to the pixel electrodes 10*g*. The light blocking portion 10*l* restricts light from traveling between the adjacent pixels PX to ensure independency of tones of each pixel PX. Especially, sections of the light blocking portion 10*l* extending along the source lines 10*j* reduce color mixture between the pixels PX that exhibit different colors. The light blocking portion 10*l* is disposed to overlap the gate lines 10*i* and the source lines 10*j* on the array substrate 10*b* in a plan view.

As illustrated in FIG. 4, spacers 10*p* are disposed between the substrates 10*a* and 10*b* in the display area AA to maintain a thickness of the liquid crystal layer 10*c* (a cell gap, a distance) constant. The spacers 10*p* are disposed on the CF substrate 10*a* and the array substrate 10*b* at color borders between the color filters 10*k* to penetrate the liquid crystal layer 10*c*. The spacers 10*p* include CF substrate-side spacers 10*p*1 and array substrate-side spacers 10*p*2. The CF substrate-side spacers 10*p*1 are disposed in a layer upper than the color filters 10*k* on the CF substrate to project toward the array substrate 10*b*. The array substrate-side spacers 10*p*2 are disposed on the common electrode 10*h* on the array substrate 10*b* to contact distal ends of the CF substrate-side spacers 10*p*1. Alignment films 10*m* and 10*n* are disposed on the innermost surfaces of the substrates 10*a* and 10*b* that contact the liquid crystal layer 10*c*, respectively. The alignment films 10*m* and 10*n* are for aligning the orientation of the liquid crystal molecules in the liquid crystal layer 10*c*. The alignment films 10*m* and 10*n* may be made of polyimide. The alignment films 10*m* and 10*n* are formed in solid patterns at least in about entire display areas AA of the substrates 10*a* and 10*b*. The alignment films 10*m* and 10*n* are photo-alignment films that are capable of aligning the orientation of the liquid crystal molecules along a travelling direction of rays of light in a specific wavelength region (e.g., ultraviolet rays) when irradiated with the rays of light.

A planarization film may be disposed between the alignment film 10*m* and the color filters 10*k* on the CF substrate 10*a*.

The liquid crystal panel 10 according to this embodiment has a display function for displaying images and a touch panel function (a position input function) for detecting positions of input by a user based on displayed images (input positions). The liquid crystal panel 10 includes an integrated touch panel pattern (with an in-cell technology) for exerting the touch panel function. The touch panel pattern uses a projection type electrostatic capacitance method and performs detection using a self-capacitance method. As illustrated in FIG. 2, the touch panel pattern includes touch electrodes 14 (position detection electrodes) disposed on the array substrate 10*b* of the substrates 10*a* and 10*b* and arranged in a matrix within the plate surface of the array substrate 10*b*. The touch electrodes 14 are disposed in the display area AA of the array substrate 10*b*. The display area AA of the liquid crystal panel 10 substantially corresponds with a touch area in which input positions are detectable (a position input area). The non-display area NAA substantially corresponds with a non-touch area in which input positions are not detectable (a non-position input area). When the user intends to input a position based on a displayed image in the display area AA of the liquid crystal panel 10 recognized by the user and brings his or her finger (a position input body), which is a conductive member but not illustrated, closer to the surface of the liquid crystal panel 10 (a display surface), the finger and the touch electrode 14 form a capacitor. A capacitance measured at the touch electrode 14 close to the finger changes as the finger approaches to the touch electrode 14. The capacitance at the touch electrode 14 is different from the capacitance at the touch electrodes 14 farther from the finger. The input position can be detected based on the difference.

As illustrated in FIG. 2, the touch electrodes 14 are constructed from the common electrode 10*h* on the array substrate 10*b*. The common electrode 10*h* includes the touch electrodes 14 that are separated from one another to be arranged in a grid and electrically independent from one another. The touch electrodes 14 that are provided by dividing the common electrode 10*h* are arranged in a matrix including lines of the touch electrodes 14 along the X-axis direction and the Y-axis direction in the display area AA. Each touch electrode 14 has a substantially square shape in a plan view with about some millimeters (e.g., two to five millimeters) of edges. The touch electrodes 14 are significantly larger than the pixels PX (or the pixel electrodes 10*g*) in the plan view. Each touch electrode 14 is disposed in an area that covers multiple (e.g., several tens or hundreds of) pixels PX with respect to the X-axis direction and the Y-axis direction. Multiple touch lines 15 (the position detection lines) on the array substrate 10*b* are selectively connected to the touch electrodes 14. The touch lines 15 extend parallel to the source lines 10*j* and substantially along the Y-axis direction. The touch lines 15 are connected to specific ones of the touch electrodes 14 that are arranged along the Y-axis direction. The touch lines 15 are connected to a detection circuit that is not illustrated. The detection circuit may be included in the driver 11 or may be provided outside the liquid crystal panel 10 and connected via the flexible circuit board 12. The touch lines 15 supply reference voltage signals related to the image display function and touch signals (position detection signals) related to the touch function to the touch electrodes 14 at different timing. When the reference voltage signals are transmitted to all the touch lines 15 at the same time, all the touch electrodes 14 are at the reference potential and function as the common electrode 10h. FIG. 2 schematically illustrates the arrangement of the touch electrodes 14. The number, the arrangement, and the two-dimensional shape of the touch electrodes 14 may be altered from those in the drawings where appropriate.

Films stacked on top of one another on the inner surface of the array substrate 10b will be described. As illustrated in FIG. 4, on the glass substrate 10GS of the array substrate 10b, a first metal film 16 (a gate metal film, a conductive film), a gate insulator 17, a semiconductor film 18, a second metal film 19 (a source metal film, a conductive film), a planarization film 20 (an insulator, an organic insulator), a third metal film 21 (a conductive film), a lower interlayer insulator 22 (an insulator, an inorganic insulator), a first transparent electrode film 23 (a conductive film), an upper interlayer insulator 24 (an insulator, an inorganic insulator), a second transparent electrode film 25 (a conductive film), and an organic insulator 30 are disposed on top of one another in this sequence from a lower layer side (on a glass substrate 10GS side).

Each of the first metal film 16, the second metal film 19, and the third metal film 21 is a single layer film made of one kind of metal selected from copper, titanium, aluminum, molybdenum, and tungsten. Alternatively, each of the first metal film 16, the second metal film 19, and the third metal film 21 is a laminated film made of different kinds of metals or alloy. The first metal film 16, the second metal film 19, and the third metal film 21 have conductivity and light blocking properties. The gate lines 10i and the gate electrodes 10/1 of the TFTs 10f are sections of the first metal film 16. The source lines 10j, the touch lines 15, and the source electrodes 10/2 and the drain electrodes 10/3 of the TFTs 10f are sections of the second metal film 19. The touch lines 15 are sections of the third metal film 21. The gate insulator 17, the lower interlayer insulator 22, and the upper interlayer insulator 24 are made of non-organic material such as silicon nitride ($SiN_x$) and silicon oxide ($SiO_2$). The gate insulator 17 insulates the metal films 19 and 21 and the transparent electrode films 23 and 25 on the upper layer side from the metal films 16, 19 and 21 and the first transparent electrode film 23 on the lower layer side. The insulators 17, 22 and 24 made of the inorganic materials are disposed to straddle the display area AA and the non-display area NAA. The thicknesses of the insulators 17, 22 and 24 made of the inorganic materials are smaller than the thickness of the planarization film 20 and the organic insulator 30, which will be described next. The planarization film 20 and the organic insulator 30 are made of an organic material such as an acrylic resin (e.g., PMMA). The planarization film 20 and the organic insulator 30 have thicknesses larger than the thicknesses of the insulators 17, 22 and 24 made of the inorganic materials. The planarization film 20 has a function to compensate steps created in layers lower than the planarization film 20. The semiconductor film 18 is a thin film made of a material such as amorphous silicon or an oxide semiconductor. Channels 10/4 (semiconductor portions) connected to the source electrodes 10/2 and the drain electrodes 10/3 are sections of the semiconductor film 18. The first transparent electrode film 23 and the second transparent electrode film 25 are made of transparent electrode materials (e.g., indium tin oxide (ITO)) and disposed to straddle the display area AA and the non-display area NAA. The pixel electrodes 10g are sections of the first transparent electrode film 23. The common electrode 10h (the touch electrodes 14) is a section of the second transparent electrode film 25.

The configurations of the TFTs 10f and the pixel electrodes 10g will be described in detail. As illustrated in FIGS. 3 and 4, the TFTs 10f include the gate electrodes 10/1 that are branched off from the gate lines 10i that are prepared from the first metal film 16. The TFTs 10f include the source electrodes 10/2 that are sections of the source lines 10j that are prepared from the second metal film 19 overlapping the gate electrodes 10/1. The TFTs 10f include the drain electrodes 10/3 that are prepared from the second metal film 19 and separated from the source electrodes 10/2 with gaps. Each of the drain electrodes 10/3 has a substantially L shape in the plan view. First ends of the drain electrodes 10/3 are opposed to the source electrodes 10/2 and connected to the channels 10/4. Second ends of the drain electrodes 10/3 are connected to the pixel electrodes 10g. The pixel electrodes 10g prepared from the first transparent electrode film 23 include pixel electrode bodies 10g1 and contacts 10g2. Each of the pixel electrode bodies 10gi has a substantially parallelogram shape. The contacts 10g2 project from the pixel electrode bodies 10g1 toward the TFTs 10f along the Y-axis direction. The contacts 10g2 are connected to the drain electrodes 10/3. The contacts 10g2 prepared from the first transparent electrode film 23 and the drain electrodes 10/3 partially overlap each other. The overlapping sections of the contacts 10g2 and the drain electrodes 10/3 are connected to each other via pixel contact holes 26 drilled through the planarization film 20 and the lower interlayer insulator 22 disposed therebetween. The TFTs 10f include the channels 10/4 that overlap the gate electrodes 10/1 via the gate insulator 17. The channels 10/4 are prepared from the semiconductor film 18 and connected to the source electrodes 10/2 and the drain electrodes 10/3. When the TFTs 10f are tuned on based on the scan signals supplied to the gate electrodes 10/1 via the gate lines 10i, potentials related to the image signals supplied to the source lines 10j are supplied from the source electrodes 10/2 to the drain electrodes 10/3 via the channels 10/4 to charge the pixel electrodes 10g.

Next, the touch lines 15 will be described in detail. As illustrated in FIGS. 3 and 4, the touch lines 15 prepared from the third metal film 21 are connected to the corresponding touch electrodes 14 prepared from the second transparent electrode film 25 via touch electrode contact holes 27 in an internal space 10IS and the display area AA (inside the sealant 10d). The touch electrode contact holes 27 are drilled through the lower interlayer insulator 22 and the upper interlayer insulator 24. The touch lines 15 include wide sections adjacent to the TFTs 10f (the drain electrodes 10/3) in the X-axis direction. Wide sections 15a function as connecting pads for the touch electrodes 14. The wide sections 15a are the sections of the touch lines 15 that cross the TFTs 10f arranged in lines along the Y-axis direction at positions adjacent to the TFTs 10f. The touch electrode contact holes 27 are arranged to overlap some of (or one of) the wide sections 15a. The touch lines 15 extend substantially along the Y-axis direction to cross all the touch electrodes. However, the touch lines 15 are connected to the specific touch electrodes 14 according to the two-dimensional arrangement of the touch electrode contact holes 27. The touch lines 15 are disposed to overlap the source lines 10j in the plan view.

As illustrated in FIG. 2, the touch lines 15 are drawn from the display area AA to the non-display area AA. Leading ends of the touch lines 15 are connected to touch leads 28. The touch leads 28 are routed to spread in a fan shape. First ends of the touch leads 28 are connected to the touch lines 15 and second ends of the touch leads 28 are connected to the driver 11. The first ends of the touch lines 28 prepared from the second metal film 19 overlap the leading ends of the touch lines 15 prepared from the third metal film 21. The first ends and the leading ends overlapping each other are connected to each other via touch line contact holes 29 drilled through the planarization film 20 disposed therebetween. The second ends of the touch leads 28 include terminals connected to the driver 11. Similar to the touch lines 15, the source lines 10j are connected to the driver 11 via source leads that may be prepared from the first metal film 16.

Figure 5:
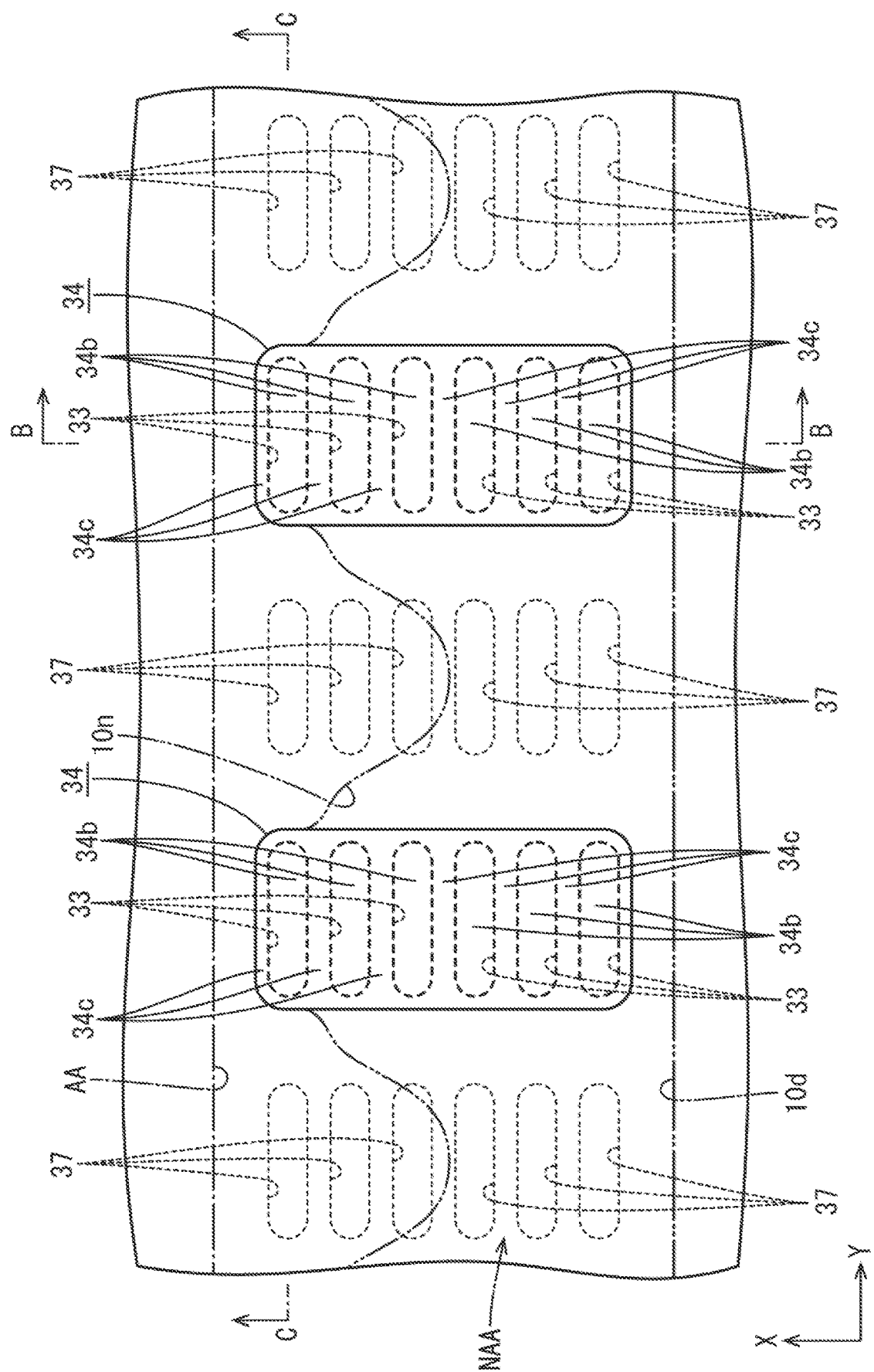
FIG. 5 is a plan view illustrating a two-dimensional arrangement of contact holes and contact hole fillers in a non-display area of the array substrate.
Figure 6:
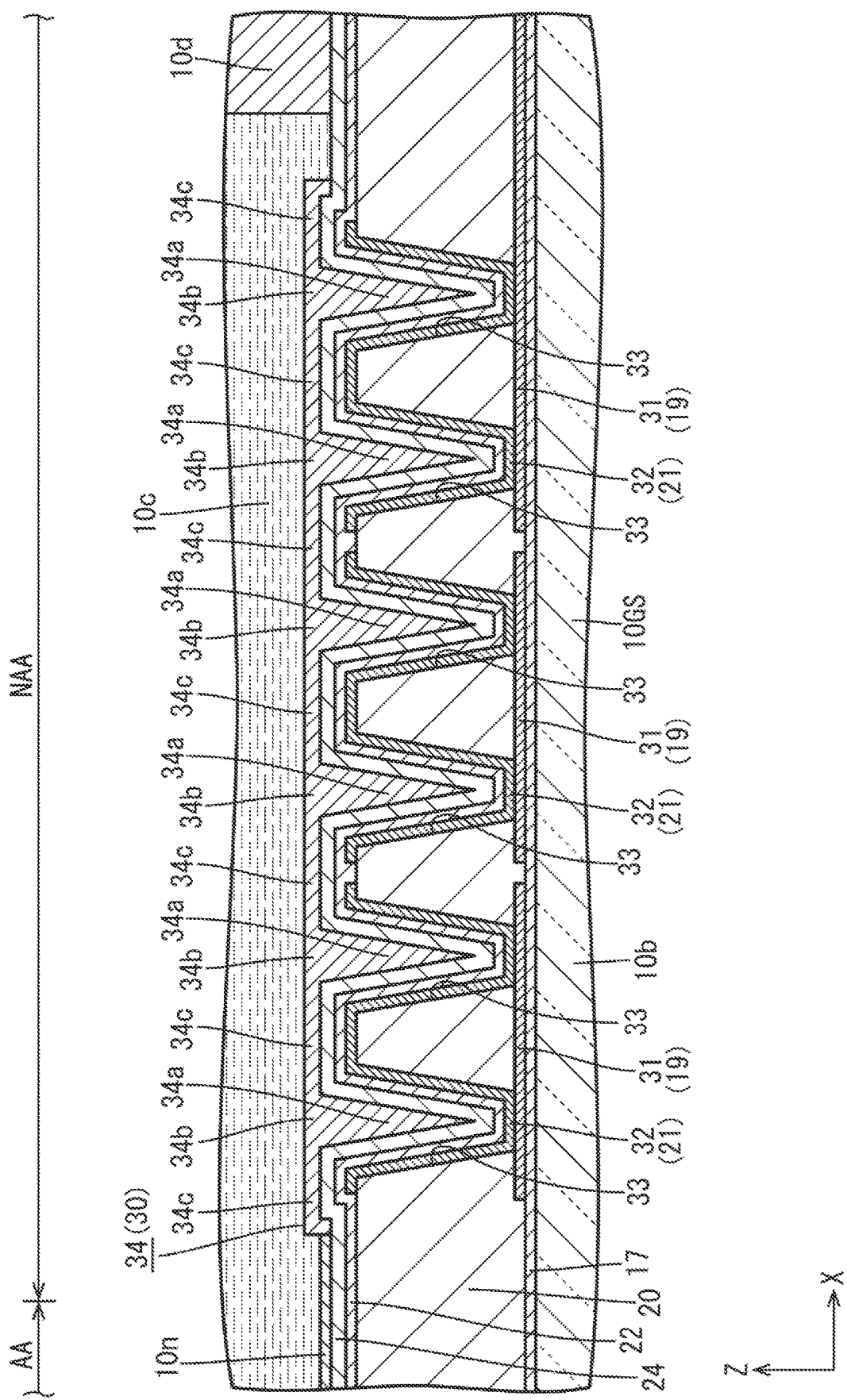
FIG. 6 is a cross-sectional view along line B-B in FIG. 5.
Figure 7:
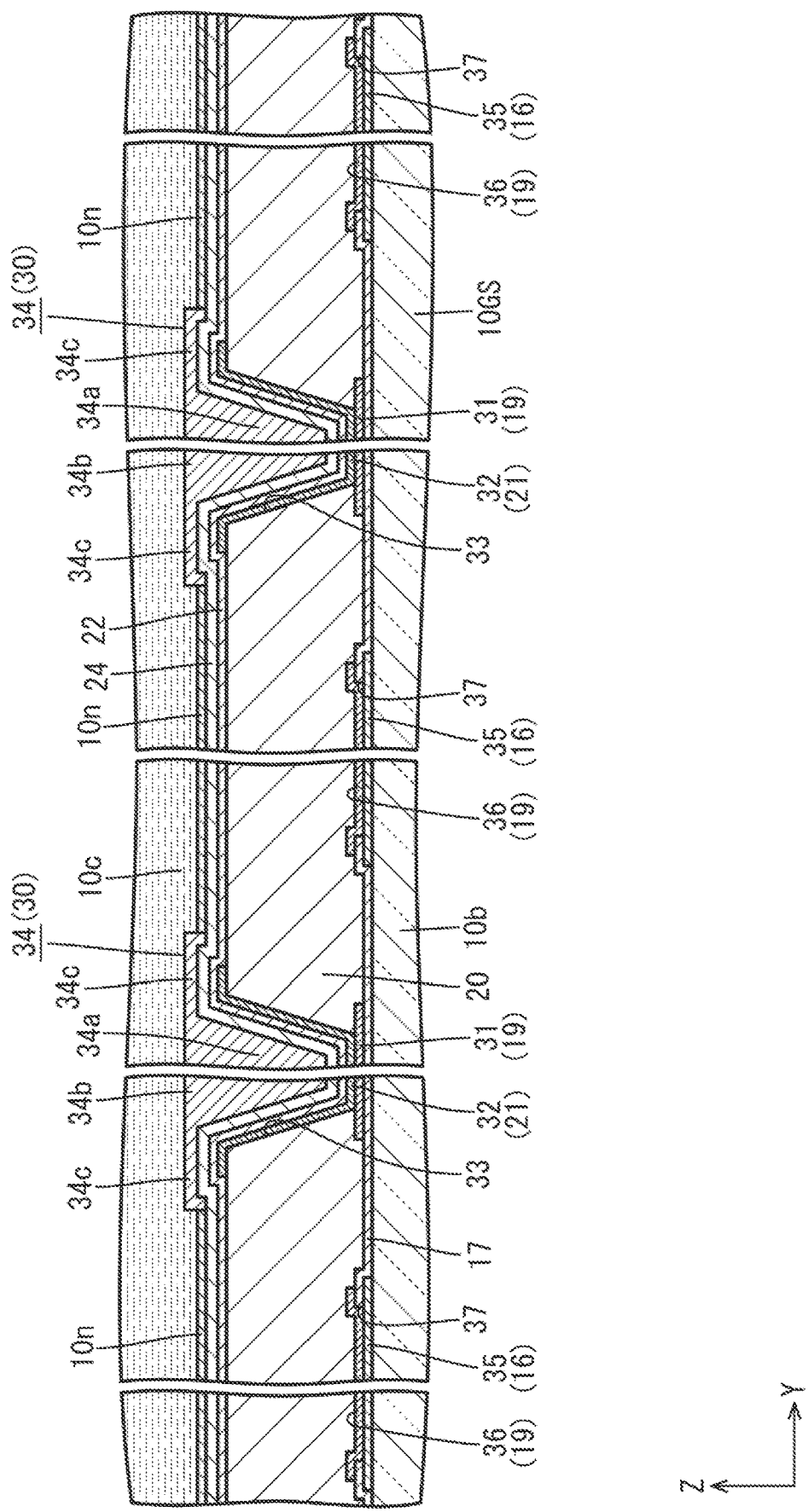
FIG. 7 is a cross-sectional view along line C-C in FIG. 5.

As illustrated in FIGS. 5 and 6, first conductive members 31 and second conductive members 32 are disposed in the non-display area of the glass substrate 10GS included in the array substrate 10b according to this embodiment. The first conductive members 31 are disposed in a layer that is lower than the planarization film 20. The second conductive members 32 are disposed in a layer that is upper than the planarization film 20. The first conductive members 31 and the second conductive members 32 are disposed such that sections thereof overlap each other. Contact holes 33 are drilled through sections of the planarization film 20 disposed between the first conductive members 31 and the second conductive members 32. The overlapping sections of the first conductive members 31 and the second conductive members 32 are electrically connected to each other via the contact holes 33. The first conductive members 31 are prepared from the second metal film 19. The second conductive members 32 are prepared from the third metal film 21. The first conductive members 31 and the second conductive members 32 may be connecting lines and electrodes of circuit components. The connecting lines are connected to the gate lines 10i and the source lines 10j. The circuit components are included in circuits (e.g., a GDM circuit, a switching circuit, and an ESD protection circuit) connected to the gate lines 10i and the source lines 10j. In the contact holes 33 drilled through the planarization film 20, the lower interlayer insulator 22 and the upper interlayer insulator 24 that are disposed in layers that are upper than the planarization film 20 are disposed. The first conductive members 31, the second conductive members 32, and the contact holes 33 are arranged in the X-axis direction (in a direction away from the display area AA). Two contact holes 33 are arranged in the X-axis direction in each section overlapping the first corresponding conductive member 31 and the corresponding second conductive member 32. The first conductive members 31, the second conductive members 32, and the contact holes 33 are located in a section of the non-display area NAA of the array substrate 10b closer to the display area AA relative to the sealant 10d to overlap the liquid crystal layer 10c. As illustrated in FIGS. 5 and 7, in the non-display area NAA of the glass substrate 10GS included in the array substrate 10b, lower first conductive members 35 and lower second conductive members 36 are disposed at positions adjacent to the first conductive members 31, the second conductive members 32, and the contact holes 33 in the Y-axis direction. The lower first conductive members 35 are prepared from the first metal film 16. The lower second conductive members 36 are prepared from the second metal film 19 and disposed to overlap the lower first conductive members 35. The gate insulator 17 is disposed between the lower first conductive members 35 and the lower second conductive members 36. Lower contact holes 37 are drilled through sections of the gate insulator 17 overlapping the lower first conductive members 35 and the lower second conductive members 36. The overlapping section of each lower first conductive member 35 and the overlapping section of the corresponding lower second conductive member 36 are electrically connected to each other via the corresponding lower contact hole 37. The lower first conductive members 35, the lower second conductive members 36, and the lower contact holes 37 are arranged in the X-axis direction. As illustrated in FIG. 5, sets of the first conductive members 31, the second conductive members 32, and the contact holes 33 arranged in the X-axis direction and sets of the lower first conductive members 35, the lower second conductive members 36, and the lower contact holes 37 arranged in the X-axis direction are alternately and repeatedly arranged in the Y-axis direction (along an edge of the display area AA).

As illustrated in FIGS. 5 to 7, in the non-display area NAA of the array substrate 10b, the contact holes 33 are filled with the contact hole fillers 34. The contact hole fillers 34 are disposed in a layer that is upper than the second conductive members 32, the lower interlayer insulator 22, and the upper interlayer insulator 24. The contact hole fillers 34 are made of the same material as that of the array substrate-side spacers 10p2 included in the spacers 10p. The formation of the alignment film 10n on the array substrate 10b, the material of the alignment film 10n having flowability is supplied to the display area AA of the glass substrate 10GS included in the array substrate 10b. The material flows and spreads in the display area AA to form the alignment film 10n in the display area AA. The material may flows from the display area AA to the non-display area NAA. If the material of the alignment film 10n reaches the non-display area NAA, the material may remain outside the contact holes 33 without flowing into the contact holes 33 due to surface tensions at hole edges of the contact holes 33 in the planarization film 20. This may cause local increases in thickness of the planarization film 20. Because the contact holes 33 are filled with the contact hole fillers 34 disposed in the layer upper than the second conductive members 32, the material of the alignment film 10n, which has reached the non-display area NAA, is less likely to remain at the hole edges of the contact holes 33. Therefore, the local increases in thickness of the planarization film 20 are less likely to occur around the hole edges of the contact holes 33 and thus variations in thickness of the alignment film 10n are less likely to occur. Because the variations in thickness of the alignment film 10n are less likely to occur, a decrease in display quality is less likely to occur in the outer edge sections of the display area AA of the liquid crystal panel 10 (around a border between the display area AA and the non-display area NAA).

The planarization film 20 through which the contact holes 33 are drilled is made of the organic material. In comparison to a configuration in which the planarization film is made of an inorganic material, the thickness of the planarization film 20 is larger and thus the depth of the contact holes 33 is larger. Therefore, the material of the alignment film 10n flowing during the formation tends to remain at the hole edges of the contact holes 33. Because the contact holes 33 are filled with the contact hole fillers 34, the material of the alignment film 10n is less likely to remain at the hole edges of the contact holes 33. This configuration can more properly reduce the variations in thickness of the alignment film 10n. The contact hole fillers 34 and the array substrate-side spacers 10p2 included in the spacers 10p are made of the same material. In comparison to a configuration in which the contact hole fillers are made of a material that is different from the material of the array substrate-side spacers 10p2, the production cost can be reduced by producing the contact hole fillers 34 and the array substrate-side spacers 10p2 from the same material. Furthermore, the spacers 10p have the height equal to the distance between the array substrate 10b and the CF substrate 10a. Even if the depth of the contact holes 33 become larger due to an increase in thickness of the planarization film 20, the contact holes 33 can be sufficiently filled with the contact hole fillers 34 because the contact hole fillers 34 and the array substrate-side spacers 10p2 are made of the same material.

As illustrated in FIGS. 6 and 7, the contact hole fillers 34 include filler bodies 34a, protruding portions 34b, and enlarged portions 34c. The filler bodies 34a are disposed in the contact holes 33. The protruding portions 34b protrude more to the front than the surfaces of the planarization film 20, the lower interlayer insulator 22, and the upper interlayer insulator 24. The enlarged portions 34c overlap the hole edges of the contact holes 33. In comparison to a configuration in which the contact hole fillers do not protrude from the planarization film 20, the lower interlayer insulator 22, and the upper interlayer insulator 24 (a configuration in which the contact hole fillers are flush with the surface of the upper interlayer insulator 24), the contact holes 33 are more properly filled with the contact hole fillers 34 even if variations in height of the contact hole fillers 34 occur due to production errors. According to the configuration, the local increases in thickness of the alignment film 10n are less likely to occur at the hole edges of the contact holes. Because the contact hole fillers 34 include the enlarger portions 34c that overlap the hole edges of the contact holes 33, the material of the alignment film 10n is less likely to reach the hole edges of the contact holes 33 during the formation of the alignment film 10n. Therefore, the local increases in thickness of the alignment film 10n at the hole edges of the contact holes 33 are further less likely to occur. The enlarged portions 34c are disposed to cover the hole edges of the contact holes 33 for entire circumferences and steps that may be created in the upper interlayer insulator 24 due to the sections of the second conductive members 32 overlapping the hole edges of the contact holes 33.

As illustrated in FIGS. 5 and 6, each contact hole filler 34 is disposed to fill multiple contact holes 33 arranged in the X-axis direction (a direction away from the display area AA). Each contact hole filler 34 includes multiple filler bodies 34a that fill the contact holes 33 and multiple protruding portions 34b protruding from the filler bodies 34a, respectively. The filler bodies 34a and the protruding portions 34b are coupled to each other via the enlarged portions 34c disposed between the contact holes 33 that are adjacent to each other in the X-axis direction. Because the contact hole fillers 34 straddle the contact holes 33 that are arranged in the X-axis direction, the alignment film 10n is less likely to enter spaces between the contact holes 33 that are adjacent to each other in the X-axis direction. According to the configuration, the material of the alignment film 10n is further less likely to reach the hole edges of the contact holes 33 during the formation of the alignment film 10n. Therefore, the local increases in thickness of the alignment film 10n at hole edges of the contact holes 33 are further less likely to occur.

As illustrated in FIGS. 5 and 7, the contact hole fillers 34 are arranged at intervals in the Y-axis direction (along the edge of the display area AA) similar to the contact holes 33. Spaces for the lower first conductive members 35, the lower second conductive members 36, and the lower contact holes 37 are provided between the contact holes 33 and the contact hole fillers 34 arranged in the Y-axis direction. The planarization film 20 disposed in the layer that is upper than the lower contact holes 37 is filled. Namely, the surfaces of the sections of the planarization film 20 overlapping the lower contact holes 37 are planarized. Therefore, the material of the alignment film 10n is less likely to remain at the hole edges of the lower contact holes 37 during the formation of the alignment film 10n. During the formation of the alignment film 10n, the material of the alignment film 10n flowing from the display area AA to the non-display area NAA spreads in the X-axis direction (the direction away from the display area AA) crossing the Y-axis direction (along the edge of the display area AA). The contact holes 33 and the contact hole fillers 34 are arranged at intervals along the edge of the display area AA. Therefore, the material of the alignment film 10n flowing during the formation of the alignment film 10n flows between the contact hole fillers 34 that are adjacent to each other in the Y-axis direction and spreads away from the display area AA. The flow of the material of the alignment film 10n is less likely to be restricted by the contact hole fillers 34 protruding from the surface of the planarization film 20. Therefore, the local increases in thickness of the alignment film 10n at specific points are less likely to occur. This configuration is preferable for reducing the variations in thickness of the alignment film 10n.

As described earlier, the array substrate 10b (the display substrate) in this embodiment includes the glass substrate 10GS (the substrate), the first conductive members 31, the second conductive members 32, the alignment film 10n, the planarization film 20, and the contact hole fillers 34. The glass substrate 10GS includes the display area AA in which the images are displayed and the non-display area NAA that surrounds the display area AA. The first conductive members 31 are disposed at least in the non-display area NAA of the glass substrate 10GS. The second conductive members 32 are disposed in the layer that is upper than the first conductive members 31 to at least partially overlap the first conductive members 31 at least in the non-display area NAA of the glass substrate 10GS. The alignment film 10n is disposed in the layer that is upper than the second conductive members 32 to straddle the display area AA and the non-display area NAA of the glass substrate 10GS. The planarization film 20 is disposed between the first conductive members 31 and the second conductive members 32 at least in the non-display area NAA of the glass substrate 10GS. The planarization film 20 includes the contact holes 33 drilled through the sections of the planarization film 20 overlapping the first conductive members 31 and the second conductive members 32. The contact hole fillers 34 are disposed in the layer that is upper than the second conductive members 32 in the non-display area NAA of the glass substrates 10GS.

In this configuration, the first conductive members 31 and the second conductive members 32 are disposed at least in the non-display area NAA of the glass substrate 10GS to overlap each other. The sections of the first conductive members 31 and the sections of the second conductive members 32 overlapping each other are connected to each other via the contact holes 33 drilled through the planarization film 20 therebetween. During the formation of the alignment film, the material of the alignment film 10n having the flowability is supplied to the display area AA of the glass substrate 10GS. The material flows to spread the display area AA and the alignment film 10n is formed in the display area AA. The material may flow from the display area AA to the non-display area NAA. The material of the alignment film 10n, which has reached the non-display area NAA, remains at the hole edges of the contact holes 33 in the planarization film 20 without flowing into the contact holes 33 because of the surface tensions. This may cause the local increases in the thickness of the alignment film 10n. Because the contact holes 33 are filled with the contact hole fillers 34 disposed in the layer that is upper than the second conductive members 32. Therefore, the material of the alignment film 10n, which has reached the non-display area NAA, is less likely to remain at the hole edges of the contact holes 33. According to the configuration, the local increases in thickness of the alignment film 10n at the hole edges of the contact holes 33 are less likely to occur and thus the variations in thickness of the alignment film 10n are less likely to occur.

The contact hole fillers 34 protrude from the surface of the planarization film 20. In comparison to a configuration in which the contact hole fillers are flush with the surface of the planarization film 20, the contact holes 33 are more properly filled with the contact hole fillers 34 even if variations in height of the contact hole fillers 34 are created due to production errors. According to the configuration, the local increases in thickness of the alignment film 10n at the hole edges of the contact holes 33 are further less likely to occur.

The contact hole fillers 34 include the enlarged portions 34c disposed to overlap the hole edges of the contact holes 33 in the planarization film 20. Because the enlarged portions 34c of the contact hole fillers 34 are disposed to overlap the hole edges of the contact holes 33 in the planarization film 20, the material of the alignment film 10n is less likely to reach the hole edges of the contact holes 33 during the formation of the alignment film 10n. Therefore, the local increases in thickness of the alignment film 10n at the hole edges of the contact holes 33 are further less likely to occur.

In the planarization film 20, the contact holes 33 are arranged at intervals in the direction away from the display area AA. The contact hole fillers 34 are disposed to straddle the contact holes 33 arranged in the direction away from the display area AA. Because the contact hole fillers 34 are disposed to straddle the contact holes 33 arranged in the direction away from the display area AA, the alignment film 10n is less likely to enter the spaces between the adjacent contact holes 33. According to the configuration, the material of the alignment film 10n is less likely to reach the hole edges of the contact holes 33 during the formation of the alignment film 10n. Therefore, the local increases in thickness of the alignment film 10n at the hole edges of the contact holes 33 are further less likely to occur.

In the planarization film 20, the contact holes 33 are arranged at intervals along the edge of the display area AA. The contact hole fillers 34 are arranged at intervals along the edge of the display area AA. During the formation of the alignment film 10n, the material of the alignment film 10n, which has flowed from the display area AA and reached the non-display area NAA, spreads in the direction that crosses the edge of the display area AA and away from the display area AA. The contact holes 33 and the contact hole fillers 34 are arranged at intervals along the edge of the display area AA. The material of the alignment film 10n flowing during the formation of the alignment film 10n passes through the spaces between the contact hole fillers 34 that are adjacent to each other along the edge and spreads away from the display area AA. Because the flow of the material of the alignment film 10n is less likely to be restricted by the contact hole fillers 34 that protrude from the surface of the planarization film 20, the local increases in thickness of the alignment film 10n at specific points are less likely to occur. This configuration is preferable for reducing the variations in thickness of the alignment film 10n.

The planarization film is made of the organic material. In comparison to a configuration in which the planarization film is made of an inorganic material, the thickness of the planarization film 20 is larger and thus the depth of the contact holes 33 is larger. Therefore, the material of the alignment film 10n flowing during the formation of the alignment film 10n tends to remain at the hole edges of the contact holes 33. Because the contact holes 33 are filled with the contact hole fillers 34, the material of the alignment film 10n is less likely to remain at the hole edges of the contact holes 33. Therefore, the variations in thickness of the alignment film 10n are further less likely to occur.

The liquid crystal panel 10 (the display device) according to this embodiment includes the array substrate 10b (the display substrate) described above and the CF substrate 10a (the opposed substrate) opposed to the array substrate 10b with the internal space between the CF substrate 10a and the array substrate 10b. In the display device having such a configuration, the variations in thickness of the alignment film 10n are less likely to occur in the array substrate 10b. Therefore, the reduction in display quality is less likely to occur at the outer edge section of the display area AA.

The spacers 10p are disposed between the array substrate 10b and the CF substrate 10a in the display area AA. The contact hole fillers 34 and the array substrate-side spacers 10p2 included in the spacers 10p are made of the same material. With the spacers 10p, the distance between the array substrate 10b and the CF substrate 10a is maintained constant in the display area AA. In comparison to a configuration in which the material of the contact hole fillers is different from the material of the array substrate-side spacers 10p2 included in the spacers 10p, the production cost can be reduced because the same material is used for the contact hole fillers 34 and the array substrate-side spacers 10p2 included in the spacers 10p. The spacers 10p have the height about equal to the distance between the array substrate 10b and the CF substrate 10a. Although the contact hole fillers 34 and the array substrate-side spacers 10p2 included in the spacers 10p are made of the same material and the depth of the contact holes 33 is larger because the thickness of the planarization film 20 is larger, the contact holes 33 are sufficiently filled.

Second Embodiment

A second embodiment will be described with reference to FIG. 8. The second embodiment includes first conductive members 131 and lower second conductive members 136 that are connected to each other. Components, functions, and effects similar to those of the first embodiment previously described will not be described.

Figure 8:
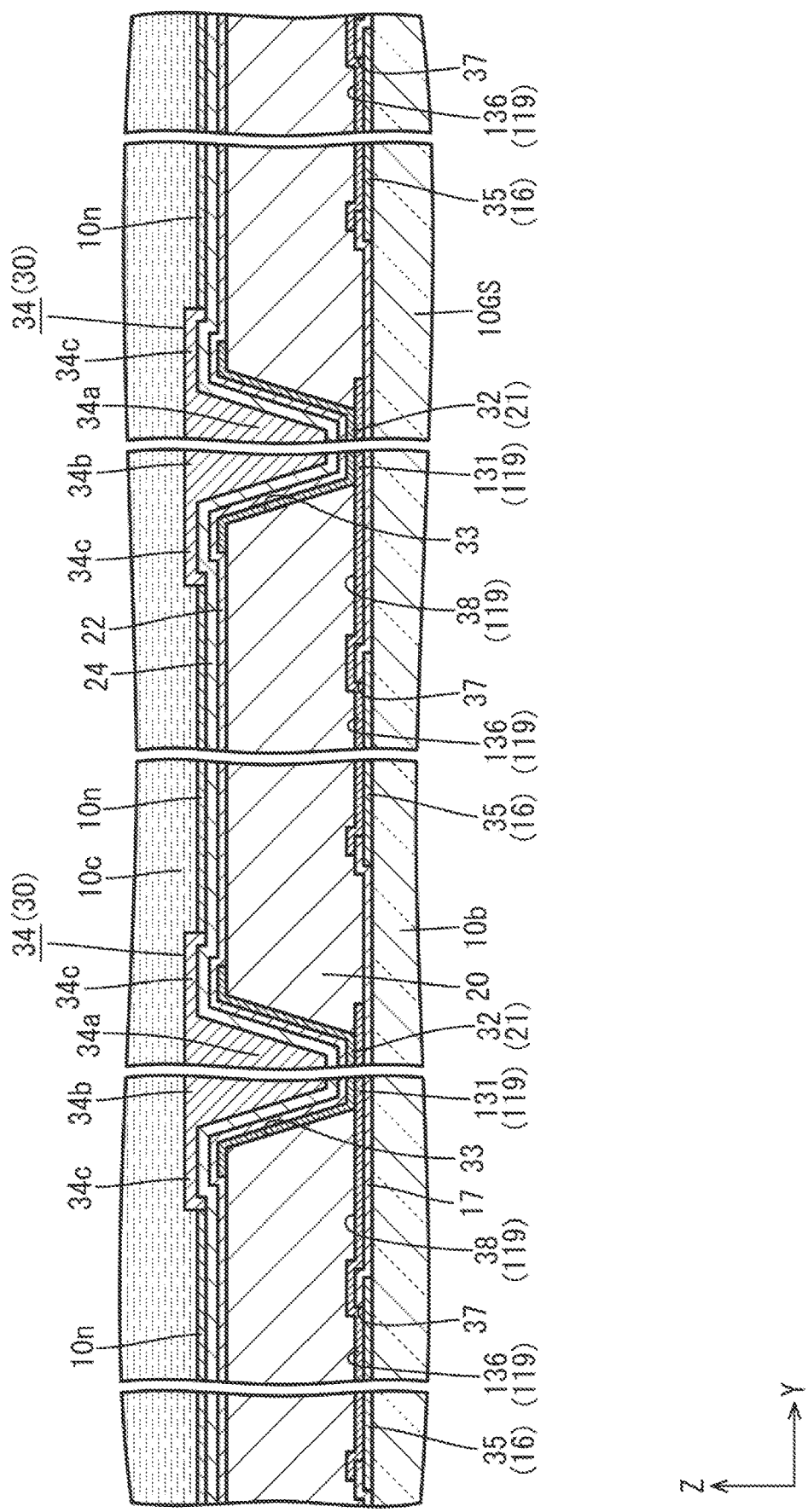
FIG. 8 is a cross-sectional view illustrating contact holes and contact hole fillers in a non-display area of an array substrate included in a liquid crystal panel according to a second embodiment of the present invention.

As illustrated in FIG. 8, the first conductive members 131 and the lower second conductive members 136 in this embodiment are disposed in the same layer and connected to each other via connecting members 38. The connecting members 38 are prepared from a second metal film 119 from which the first conductive members 131 and the lower second conductive members 136 are prepared. The connecting members 38 are disposed between the first conductive members 131 and the lower second conductive members 136 with respect to the Y-axis direction. Ends of each connecting member 38 are connected to the corresponding first conductive member 131 and the corresponding lower second conductive member 136, respectively.

Third Embodiment

A third embodiment will be described with reference to FIG. 9. The third embodiment includes first conductive members 231 defined as touch leads 228 and second conductive members 232 defined as touch lines 215, which are different from the first embodiment. Components, functions, and effects similar to those of the first embodiment previously described will not be described.

Figure 9:
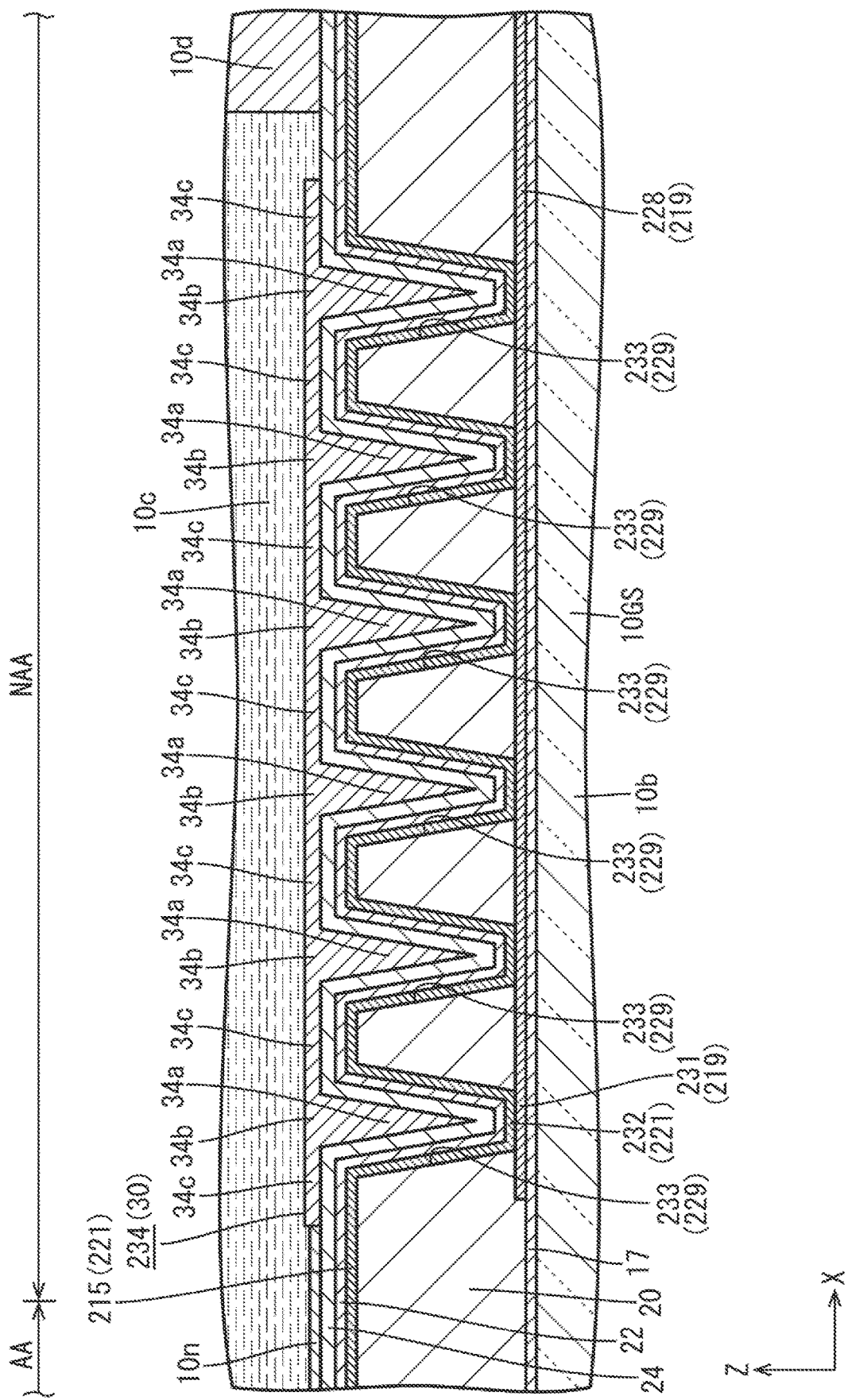
FIG. 9 is a cross-sectional view illustrating contact holes and contact hole fillers in a non-display area of an array substrate included in a liquid crystal panel according to a third embodiment of the present invention.

As illustrated in FIG. 9, the first conductive members 231 in this embodiment are defined as the touch leads 228 and the second conductive members 232 are defined as the touch lines 215. The touch lines 215 are prepared from a third metal film 221. Ends of the touch lines 215 drawn from the display area AA to the non-display area NAA are the second conductive members 232. The touch leads 228 are prepared from a second metal film 219. Ends of the touch leads 228 disposed in a section of the non-display area NAA closer to the display area AA are the first conductive members 231 that overlap leading ends of the touch lines 215 (the second conductive members 232). Contact holes 233 drilled through a planarization film 220 are defined as touch line contact holes 229 for connecting the touch lines 215 and the touch leads 228 together. The touch lines and the touch leads 228 are disposed to straddle the touch line contact holes 229 (the contact holes 233) arranged in the X-axis direction. Contact hole fillers 234 are disposed to fill the touch line contact holes 229 that are arranged in the X-axis direction such that each contact hole filler 234 straddles multiple touch line contact holes 229.

Other Embodiment

The technology described herein is not limited to the embodiments described above and illustrated by the drawings. For example, the following embodiments will be included in the technical scope of the present invention.

(1) In each of the above embodiments, the second conductive members are prepared from the third metal film. However, the second conductive members may be prepared from the first transparent electrode film or the second transparent electrode film. Specifically, the common electrode prepared from the second transparent electrode film is drawn from the display area to the non-display area and a leading end of the common electrode may be defined as the second conductive member. In this case, an end of the common electrode line for transmitting a reference potential signal prepared from the first metal film or the second metal film may be defined as the first conductive member. The common electrode and the common electrode line may be connected to each other via a contact hole.

(2) An embodiment having the configuration described in (1) may not include the third metal film.

(3) In each of the above embodiments, the pixel electrodes include sections of the first transparent electrode film and the common electrode includes the section of the second transparent electrode film. However, the common electrode may include a section of the first electrode film and the pixel electrode may include sections of the second transparent electrode film. If such a configuration is adapted to the configuration described in (1), the second conductive member may be prepared from the first transparent electrode film.

(4) In each of the above embodiments, the second conductive members are prepared from the second metal film. However, the second conductive members may be prepared from the first metal film. In such a case, the contact holes may be drilled through the planarization film and the gate insulator to communicate each other.

(5) In each of the above embodiments, the contact hole fillers and the array substrate-side spacers included in the spacers are made of the same material. However, the contact hole fillers may be made of a material that is different from the material of the array substrate-side spacers.

(6) In each of the above embodiments, the contact hole fillers and the contact holes are arranged at intervals in the Y-axis direction. However, the contact hole fillers may be disposed to straddle the contact holes arranged in the Y-axis direction.

(7) In each of the above embodiments, each contact hole filler is disposed to straddle multiple contact holes arranged in the X-axis direction to fill the multiple contact holes. However, the contact holes may be filled with the contact hole fillers, respectively.

(8) In each of the above embodiments, the enlarged portions of the contact hole fillers cover the hole edges of the contact holes for the entire circumferences. However, the enlarged portions of the contact hole fillers may be configured to partially cover the hole edges of the contact holes. The contact hole fillers may be disposed not to overlap the hole edges of the contact holes.

(9) In each of the above embodiments, the contact hole fillers include the protruding portions. However, the protruding portions may be omitted. Namely, the contact hole fillers may not protrude from the surfaces of the planarization film, the lower interlayer insulator, and the upper interlayer insulator (the contact hole fillers may be flush with the surface of the upper interlayer insulator).

(10) In each of the above embodiments, the lower interlayer insulator and the upper interlayer insulator are disposed in the contact holes in the non-display area. However, the lower interlayer insulator and the upper interlayer insulator may be removed in the non-display area. In such a case, the contact hole filler may be directly disposed on the second conductive members in the contact holes.

(11) In each of the above embodiments, the contact holes are drilled through the planarization film. However, the contact holes may be drilled through the lower interlayer insulator or the upper interlayer insulator.

(12) In the configuration of each of the above embodiments, at least the first conductive members or the second conductive members may be disposed in the display area.

(13) The two-dimensional shape of the contact hole fillers and the number of the contact holes arranged in the X-axis direction or the Y-axis direction may be altered from those of each of the above embodiments.

(14) The material of the semiconductor film from which the channels of the TFTs are prepared may be amorphous silicon or polysilicon rather than the material in each of the above embodiments. If the polysilicon is used for the material of the semiconductor film, it is preferable to use bottom gate type TFTs.

(15) In each of the above embodiments, the touch panel pattern uses the self-capacitance method. However, the touch panel pattern may use a mutual capacitance method.

(16) In each of the above embodiments, the transmissive liquid crystal panel is used. However, a reflective liquid crystal panel or a semitransmissive liquid crystal panel may be in the technical scope of the present invention.

(17) In each of the above embodiments, the shape of the liquid crystal display device (the liquid crystal panel or the backlight unit) in the plan view is vertically-long rectangular. However, the shape of the liquid crystal display device in the plan view may be horizontally-long rectangular, square, circular, semicircular, oval, elliptic, or trapezoidal.

(18) In each of the above embodiments, the liquid crystal panel has the configuration in which the liquid crystal layer is sandwiched between the substrates. However, a display panel including functional organic molecules other than the liquid crystal material sandwiched between substrates may be included in the technical scope of the present invention.

EXPLANATION OF SYMBOLS

10: Liquid crystal panel (Display device), 10a: CF substrate (Opposed substrate), 10b: Array substrate (Display substrate), 10n: Alignment film, 10p: Spacer, 10p2: Array substrate-side spacer (Spacer), 10GS: Glass substrate (Substrate), 20: Planarization film (Insulator), 31, 131, 231: First conductive member, 32, 232: Second conductive member, 33, 233: Contact hole, 34, 234: Contact hole filler, AA: Display area, NAA: Non-display area

The invention claimed is:

1. A display substrate comprising:
a substrate including a display area in which an image is displayed and a non-display area surrounding the display area;
a first conductive member disposed at least in the non-display area of the substrate;
a second conductive member disposed in a layer upper than the first conductive member to at least partially overlap the second conductive member at least in the non-display area of the substrate;
an alignment film disposed in a layer upper than the second conductive member to straddle the display area and the non-display area of the substrate, the alignment film having an alignment film edge in the non-display area;
an insulator disposed between the first conductive member and the second conductive member at least in the non-display area of the substrate, the insulator including at least one contact hole in a section overlapping the first conductive member and the second conductive member; and
at least one contact hole filler disposed in a layer upper than the second conductive member in the non-display area of the substrate to fill the at least one contact hole, the at least one contact hole filler having a filler edge opposite the display area and the filler edge being abutting the alignment film edge in the non-display area.

2. The display substrate according to claim 1, wherein the at least one contact hole filler is disposed to protrude from a surface of the insulator.

3. The display substrate according to claim 2, wherein the at least one contact hole filler includes an enlarged portion disposed to overlap a hole edge of the at least one contact hole in the insulator.

4. The display substrate according to claim 2, wherein
the at least one contact hole in the insulator includes contact holes arranged at intervals in a direction away from the display area, and
the at least one contact hole filler is disposed to straddle the contact holes arranged at intervals in the direction away from the display area.

5. The display substrate according to claim 1, wherein
the at least one contact hole in the insulator includes contact holes arranged at intervals along an edge of the display area, and
the at least one contact hole filler includes contact hole fillers arranged at intervals along the edge.

6. The display substrate according to claim 1, wherein the insulator is made of an organic material.

7. The display substrate according to claim 1, wherein the filler edge has a filler edge thickness and the alignment film edge has an alignment film edge thickness and the filler edge thickness is greater than the alignment film edge thickness.

8. The display substrate according to claim 1, wherein
the at least one contact hole includes contact holes and the contact holes include a first group of contact holes and a second group of contact holes,
the first group of contact holes includes first contact holes that are arranged at intervals in a perpendicular direction perpendicular to a side edge of the substrate and the second group of contact holes includes second contact holes that are arranged at intervals in the perpendicular direction,
the first group of contact holes and the second group of contact holes are arranged at an interval along the side edge of the substrate,
the at least one contact hole filler includes contact hole fillers including a first contact hole filler and a second contact hole filler that is spaced away from the first contact hole filler, and
the first contact holes are filled with the first contact hole filler and the second contact holes are filled with the second contact hole filler.

9. A display device comprising:
a display substrate including a display area in which an image is displayed and a non-display area surrounding the display area,
a first conductive member disposed at least in the non-display area of the substrate,
a second conductive member disposed in a layer upper than the first conductive member to at least partially overlap the second conductive member at least in the non-display area of the substrate,
an alignment film disposed in a layer upper than the second conductive member to straddle the display area and the non-display area of the substrate,
an insulator disposed between the first conductive member and the second conductive member at least in the non-display area of the substrate, the insulator including at least one contact hole in a section overlapping the first conductive member and the second conductive member, and
at least one contact hole filler disposed in a layer upper than the second conductive member in the non-display area of the substrate to fill the at least one contact hole;
an opposed substrate opposed to the display substrate with an internal space between the display substrate and the opposed substrate; and
a liquid crystal layer being in the internal space and between the opposed substrate and the at least one contact hole filler that is in the at least one contact hole, the liquid crystal layer overlapping the at least one contact hole in a direction in which the at least one contact hole overlaps the first conductive member and the second conductive member.

10. The display device according to claim 9, further comprising a spacer disposed between the display substrate and the opposed substrate in the display area, wherein
the at least one contact hole filler and the spacer are made of the same material.

11. The display device according to claim 9, wherein
the at least one contact hole includes contact holes and the contact holes include a first group of contact holes and a second group of contact holes,
the first group of contact holes includes first contact holes that are arranged at intervals in a perpendicular direction perpendicular to a side edge of the substrate and the second group of contact holes includes second contact holes that are arranged at intervals in the perpendicular direction, the first group of contact holes and the second group of contact holes are arranged at an interval along the side edge of the substrate, the at least one contact hole filler includes contact hole fillers including a first contact hole filler and a second contact hole filler that is spaced away from the first contact hole filler, and the first contact holes are filled with the first contact hole filler and the second contact holes are filled with the second contact hole filler.

12. A display substrate comprising:

a substrate including a display area in which an image is displayed and a non-display area surrounding the display area;

a first conductive member disposed at least in the non-display area of the substrate;

a second conductive member disposed in a layer upper than the first conductive member to at least partially overlap the second conductive member at least in the non-display area of the substrate;

an alignment film disposed in a layer upper than the second conductive member to straddle the display area and the non-display area of the substrate;

an insulator disposed between the first conductive member and the second conductive member at least in the non-display area of the substrate, the insulator including at least one contact hole in a section overlapping the first conductive member and the second conductive member; and at least one contact hole filler disposed in a layer upper than the second conductive member in the non-display area of the substrate to fill the at least one contact hole, the at least one contact hole filler not overlapping the alignment film, wherein a set of the first conductive member, the second conductive member and the contact hole is arranged in a direction away from the display area, and a set of a lower first conductive member, a lower second conductive member and a lower contact hole arranged in the direction away from the display area is alternatively and repeatedly arranged in a direction along an edge of the display area.

13. The display substrate according to claim 12, wherein the at least one contact hole includes contact holes and the contact holes include a first group of contact holes and a second group of contact holes, the first group of contact holes includes first contact holes that are arranged at intervals in a perpendicular direction perpendicular to a side edge of the substrate and the second group of contact holes includes second contact holes that are arranged at intervals in the perpendicular direction, the first group of contact holes and the second group of contact holes are arranged at an interval along the side edge of the substrate, the at least one contact hole filler includes contact hole fillers including a first contact hole filler and a second contact hole filler that is spaced away from the first contact hole filler, and the first contact holes are filled with the first contact hole filler and the second contact holes are filled with the second contact hole filler.

\* \* \* \* \*